F. X. LAUTERBUR.
REVERSIBLE, DOUBLE SPEED, FRICTION AND GEAR DRIVE FOR DOUGH MIXERS.
APPLICATION FILED JUNE 27, 1917.
1,336,783.
Patented Apr. 13, 1920.
2 SHEETS—SHEET 1.
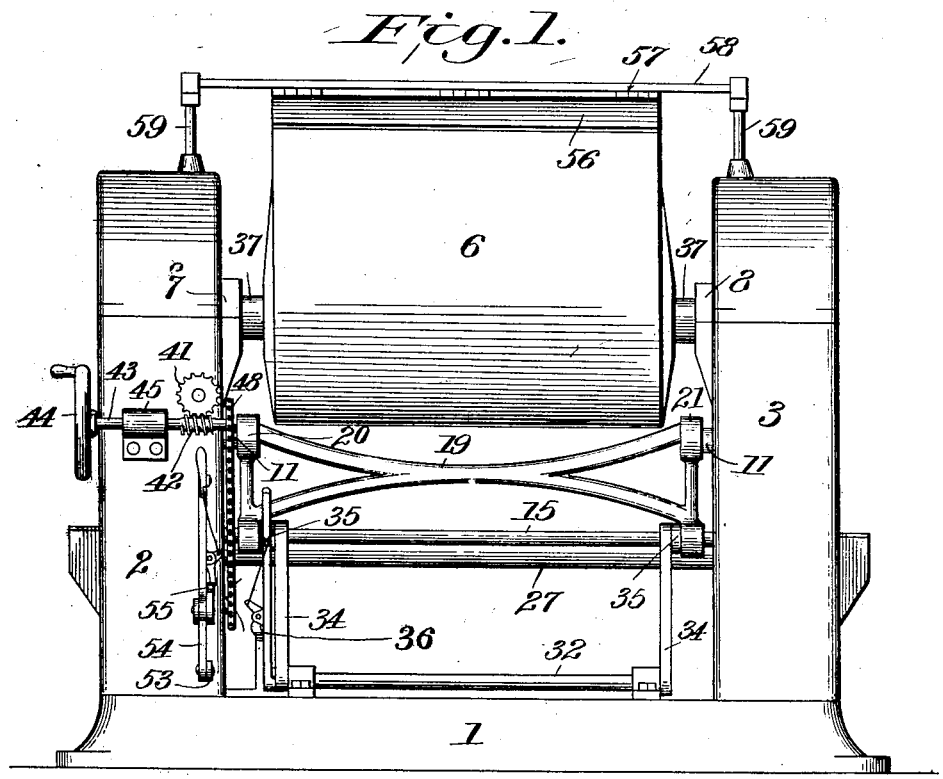

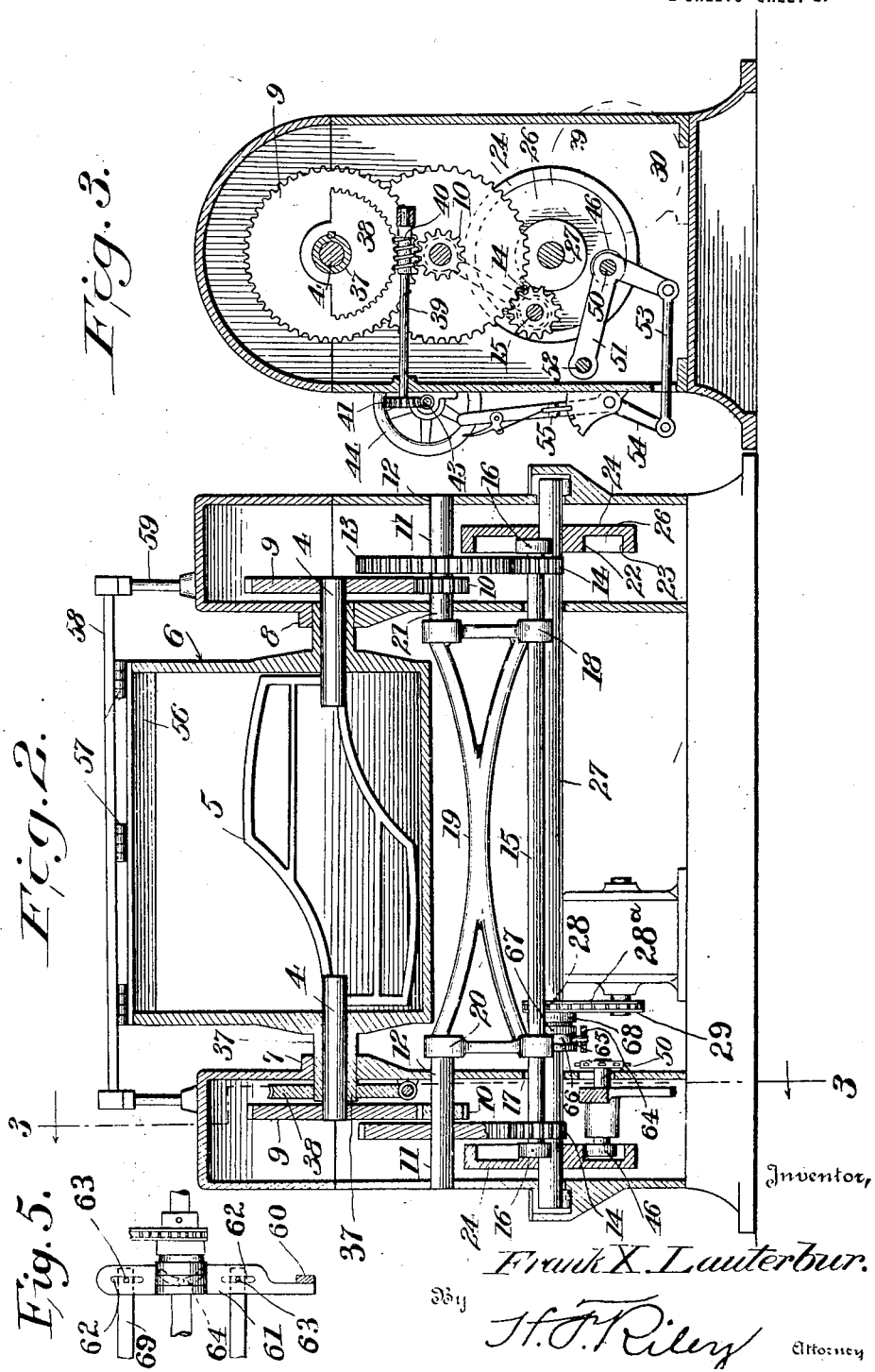

UNITED STATES PATENT OFFICE.

FRANK X. LAUTERBUR, OF SIDNEY, OHIO.

REVERSIBLE, DOUBLE-SPEED, FRICTION AND GEAR DRIVE FOR DOUGH-MIXERS.

1,336,783. Specification of Letters Patent. Patented Apr. 13, 1920.

Application filed June 27, 1917. Serial No. 177,225.

*To all whom it may concern:*

Be it known that I, FRANK X. LAUTERBUR, citizen of the United States, residing at Sidney, in the county of Shelby and State of Ohio, have invented certain new and useful Improvements in Reversible, Double-Speed, Friction and Gear Drives for Dough-Mixers, of which the following is a specification.

The invention relates to a reversible, double speed, friction and gear drive for dough mixers.

The object of the present invention is to improve the construction of dough mixers and to provide a simple, practical and efficient reversible double speed friction and gear drive adapted to be readily applied to a dough mixer and capable of enabling a rotary agitator or mixing device to be driven at two different speeds and of having its direction of rotation reversed simultaneously with the changing of the speed, whereby a more efficient and expeditious mixing of the dough is obtained.

A further object of the invention is to provide a reversible, double speed, friction and gear drive of this character of actuating a rotary agitator or mixing device at uniform high or low speed to suit the kind of dough to be mixed and of easy operation to reverse the direction of rotation of the agitator or mixing device for the desired interval of time to effect a more thorough mixing of the ingredients of the dough and the productions of a much smoother dough than is possible with a less flexible drive or one susceptible of but a single speed or incapable of reversal.

Another object of the invention is to provide a double speed friction and gear drive adapted to afford an increase in the power with the increase in the speed so that ample power will be supplied to the dough mixer when the same is performing its maximum amount of work and is subjected to its greatest resistance.

The invention also has for its object to enable the friction or gear drive to be employed for dumping the dough mixer without interfering with the provision of hand dumping mechanism and without necessitating the operation of any of such mechanism during the dough mixing operation.

With these and other objects in view, the invention consists in the novel construction and arrangement of parts hereinafter fully described, illustrated in the accompanying drawings, and pointed out in the claims hereto appended, it being understood that various changes in the form, proportion and minor detail of construction, within the scope of the appended claims, may be resorted to without departing from the spirit or sacrificing any of the advantages of the invention.

In the drawing:—

Figure 1 is a front elevation of a dough mixer provided with a reversible double speed friction drive constructed in accordance with this invention.

Fig. 2 is a longitudinal sectional view of the same.

Fig. 3 is a vertical sectional view on the line 3—3 of Fig. 2.

Fig. 4 is a detail sectional view illustrating the arrangement of the friction gearing.

Fig. 5 is a detail view of the clutch operating mechanism.

Fig. 6 is a detail view illustrating the arrangement of the double speed gear drive.

Like numerals of reference designate corresponding parts in all the figures of the drawings.

In the accompanying drawings, in which is illustrated one embodiment of the invention, the supporting frame comprises in its construction a base 1 and opposite hollow columns 2 and 3 designed to form casings or housings for the gearing, and while a pair of hollow columns or a double drive is shown the driving mechanism of one side may be omitted and such change is within the purview of the invention. Mounted between the upper portions of the hollow columns on journals 4 of a rotary agitator or mixing device 5 is a tiltable dumping dough receptacle 6, which is maintained in an upright position by dumping mechanism hereinafter described.

The journals 4, extend into the hollow columns 2 and 3, which have horizontally alined bearings 7 and 8, and mounted upon and suitably fixed to the journals 4 are gear wheels 9, which mesh with pinions 10 of intermediate horizontally alined shafts 11. The intermediate horizontal shafts 11, which are journaled in suitable bearings 12 of the hollow columns, have fixed to them gear wheels 13, which mesh with pinions 14 of a horizontal shiftable shaft 15. The shiftable shaft 15, which also carries friction pinions 16, extends across the space between the hollow columns and through openings 17 in the inner sides thereof and is journaled in lower bearings 18 of a pivoted frame 19, which is hung from the inner ends of the intermediate shafts 11. The pivoted frame 19, which operates in the space between the hollow columns is provided with upper bearings 20, to receive the intermediate shafts 11, which have extended inner ends 21, projecting from the inner sides of the columns and forming pivots for the frame 19.

The pivoted frame 19 is adapted to be oscillated to carry the friction pinions 16 into and out of frictional engagement with hub and rim portions 22 and 23 of the friction drive wheels 24 and 25 and also to a neutral portion to start and stop and to rotate the agitator or mixing device at either a low or a high speed and to reverse the rotation of the said agitator or mixing device. The friction pinions 16 are located in annular grooves or spaces 26 formed by the hub and rim portions 22 and 23 of the friction drive wheels 24 and 25 and when the friction pinions 16 are in engagement with the hub portions 22 the agitator or mixing device is operated at low speed, and when they are in engagement with the rim portions 23, the agitator or mixer is rotated at high speed. When the friction pinions are in a neutral position out of engagement with both the hub and rim portions of the friction drive wheels 24 and 25 the agitator or mixing device is stopped. The direction of rotation of the agitator or mixing device is reversed with the change of speed and the engagement of the friction pinions with the rim portions increases the power with the speed, but the drive may be through the pinions instead of through the friction wheels if desired and the opposite effect will be produced.

Any suitable means may be employed for actuating the power shaft 27 on which the friction drive wheels 24 and 25 are mounted and in the accompanying drawings, a sprocket or chain gear wheel 28 of the power shaft 27 is connected by a chain 28ª with a sprocket or chain pinion 29 of the shaft 30, of an electric motor 31, but the electric motor 31 which is mounted on the base of the supporting frame may be connected with the power shaft 27 of the friction drive in any other desired manner. Also motion may be transmitted to the power shaft from any other suitable source of power by any preferred means such as a belt and pulley.

The pivoted frame 19 may be controlled by any suitable operating means such as a rock-shaft 32 having an operating arm 33 and spaced arms 34 which are connected by links 35 with the pivoted frame, suitable locking means 36 being provided for securing the operating arm in its several positions. The rock shaft 32 and the power shaft 27 are journaled in suitable bearings of the supporting frame and any other suitable operating mechanism may be employed for carrying the friction pinions into and out of engagement with the hub and rim portions of the friction drive wheels.

The tiltable receptacle 6 which has hollow journals 6ª is provided at one side with an extension sleeve 37 extending into the hollow column 2 and arranged on the adjacent journal 4 and having fixed to it a sector worm wheel 38 which meshes with a forwardly extending worm shaft 39 located beneath the sector worm wheel 38 and provided with a worm 40 which meshes with the worm wheel 38. The shaft 39 has mounted on it a worm gear 41 which meshes with a worm 42 of a horizontal shaft 43 extending across the hollow column 2 and equipped with a hand wheel 44. The worm shafts 39 and 43 are arranged at right angles to each other and journaled in suitable bearings of the supporting frame, a bearing bracket 45 being provided for the accommodation of the worm shaft 43 but the said shafts may be mounted in any desired manner, the arrangement in the accompanying drawings being shown for convenience of illustration. The hand wheel is adapted to be operated to dump the tiltable receptacle by hand but in order to enable the receptacle 6 to be tilted and returned to its upright position by the power of the friction drive, the shaft 43 is connected with a friction pinion 46 by suitable gearing such as a belt and pulleys, sprocket gearing or the like. In the drawings, a chain belt 47 and upper and lower sprocket pulleys 48 and 49 are shown and the lower pulley or wheel 49 is mounted on a shiftable horizontal shaft 50 mounted in and carried by an angle lever 51 and having the said friction pinion 46 mounted on it as clearly shown in Fig. 2 of the drawings. The friction pinion operates in the groove or annular space 26 of the friction drive wheel 24 and it is adapted to be carried by the pivotal movement of the lever or hanger 51 into and out of frictional engagement with the hub and rim portions of the friction drive wheel 24. The lever 50 which is shown provided with angularly related arms, is mounted at one end on a suitable pivot 52 and it carries the shaft 50 at its angle and is connected at its other end by a link 53 with an operating lever 54 having suitable locking means 55. The operating lever 54 is adapted to hold the friction pinion 46 normally in a neutral position out of engagement with the friction drive wheel 24 and is adapted to be operated to engage the friction pinion with the friction wheel 24 to swing the receptacle 6 downwardly and forwardly to dump the same and to reverse the dumping mechanism to swing the receptacle upwardly and return the same to its normal operative position, the worm gearing constituting a lock for holding the tiltable receptacle normally against movement.

It will thus be clear that the reversible double feed friction drive is adapted to rotate the agitator or mixing device at either a high or low speed, reverse the direction of rotation of the same and also operate the dumping mechanism to tilt the receptacle 1 and return the same to its normal upright position.

The tiltable receptacle may be equipped with a sectional cover 56 connected by hinges 57 to an overhead horizontal supporting bar 58 which is mounted upon posts 59 arranged upon the hollow columns. The front section of the cover is swung back preparatory to dumping the receptacle and the hinged rear section does not interfere with the dumping of the receptacle and the return of the same to its normal operative position.

The hollow journals 6ª of the bowl or receptacle 6 are supported by the hollow columns or spaced supports of the main frame and they receive the journals 4, which extend through them and form a shaft for the agitator.

The controlling lever or arm 36 is preferably located at one end of the rock shaft 32 adjacent to the operating lever 54 of the dumping mechanism. This operating arm or control lever 36 is connected by a slot and pin connection 60 with a horizontally slidable bar or member 61 guided by spaced longitudinal guide slots 62 and fixed pins 63 and having an arcuate slot 64 receiving a pin 65 of a collar 66 operating in an annular groove of a slidable clutch member 67 of a clutch, having a relatively fixed member or section 68. When the controlling arm 36 is in a central or neutral position the pin is at the center of the arcuate slot and the clutch is out of engagement, and it is moved into engagement to start the motor, when the controlling lever 36 is moved in either direction to high or low speed. The guide pins 63 may be mounted in any suitable manner such as by brackets 69 extending from the adjacent hollow column 2.

It will be obvious that instead of employing a friction drive the spur or analogous gearing may be used and in Fig. 6 of the drawings is illustrated such a construction. The gear drive wheel 70 has an annular groove 71 in which operates a pinion 72. The gear wheel 70 is provided on its hub and rim portions with spur teeth 73 and 74 to mesh with the pinion 72, which is also adapted to be moved to a neutral position in the same manner as the friction pinions 16.

What I claim is:—

1. In a dough mixer, the combination with a rotatable element, of a reversible double speed friction drive including a friction wheel having spaced rim and hub portions, and a friction pinion operating between said rim and hub portions to rotate the rotatable element at high and low speeds and reverse and stop the same.

2. In a dough mixer, the combination with a rotatable element, of a reversible double speed friction drive including a friction wheel having spaced rim and hub portions, a friction pinion operating between the rim and hub portions and movable into and out of engagement with the same, gearing for connecting one of the friction elements with the rotatable element, and means for applying power to the other friction element.

3. In a dough mixer, the combination with a rotatable element, of a reversible double speed friction drive including a friction wheel having spaced rim and hub portions, a friction pinion operating between the rim and hub portions and movable into and out of engagement with the same, gearing for connecting the friction pinion with the rotatable element, and means for applying power to the friction wheel.

4. In a dough mixer, the combination with a rotatable element, of a reversible double speed friction drive including a friction wheel having spaced rim and hub portions, a friction pinion operating between the rim and hub portions and movable into and out of engagement with the same, a pivoted frame having a shaft on which the pinion is mounted, gearing connecting the shaft with the rotatable element, and operating mechanism for swinging the pivoted frame.

5. In a dough mixer, the combination with spaced supports, and a rotatable element journaled on the supports, of a power shaft, friction drive wheels mounted on the power shaft and having spaced rim and hub portions, a pivoted frame hung between the supports, a shiftable shaft carried by the pivoted frame and provided with friction pinions operating between the rim and hub portions of the friction wheel, and gearing connecting the shiftable shaft with the rotatable element.

6. In a dough mixer, the combination with spaced supports, and a rotatable element journaled on the supports, of a power shaft, friction drive wheels mounted on the power shaft and having spaced rim and hub portions, a pivoted frame hung between the supports, a shiftable shaft carried by the pivoted frame and provided with friction pinions operating between the rim and hub portions of the friction wheel, horizontally alined shafts projecting inwardly from the supports and forming pivots for the said frame and gearing connecting the shiftable shaft with the alined shafts and the rotatable element.

7. In a dough mixer, the combination with spaced supports, and a rotatable element journaled on the said supports, of horizontally alined shafts projecting inwardly from the said supports, a frame arranged between the supports below the agitator and having upper and lower bearings, the upper bearings receiving the projecting ends of the said shafts, friction drive wheels having spaced hub and rim portions, a shiftable shaft journaled in the lower bearings of the said frame and having friction pinions operating between the hub and rim portions of the friction wheels, and gearing connecting the shiftable shaft with the said alined shafts and the rotatable element.

8. In a dough mixing machine, the combination with a tiltable receptacle, a rotatable element, of a reversible double speed friction drive for the rotatable element including a friction wheel having spaced hub and rim portions, and dumping mechanism connecting with the tiltable receptacle and having a friction pinion operating between the hub and rim portions and adapted to engage the same to dump and return the receptacle, whereby the reversible friction drive is adapted to actuate the tilting receptacle in its dumping operation.

9. In a dough mixing machine, the combination with a tiltable receptacle, a rotatable element, of a reversible double speed friction drive for the rotatable element including a friction wheel having spaced hub and rim portions, and dumping mechanism connecting with the tiltable receptacle and having a friction pinion operating between the hub and rim portions and adapted to engage the same to dump and return the receptacle, whereby the reversible friction drive is adapted to actuate the tilting receptacle in its dumping operation, a pivoted hanger carrying the friction pinion and an operating device connected with the hanger.

10. In a dough mixing machine, the combination with a tiltable receptacle, a rotatable element, of a reversible double speed friction drive for the rotatable element including a friction wheel having spaced hub and rim portions, and dumping mechanism comprising a friction pinion operating between the hub and rim portions of the friction wheel, means for moving the friction pinion into and out of engagement with the friction wheel, whereby the reversible friction drive is adapted to actuate the tilting receptacle in its dumping operation, and gearing connecting the friction pinion with the receptacle.

11. In a dough mixing machine, the combination with a tiltable receptacle, a rotatable element, of a reversible double speed friction drive for the rotatable element including a friction wheel having spaced hub and rim portions, and dumping mechanism comprising a friction pinion operating between the hub and rim portions of the friction wheel, means for moving the friction pinion into and out of engagement with the friction wheel, whereby the reversible friction drive is adapted to actuate the tilting receptacle in its dumping operation, worm gearing connected with the receptacle and separate gearing including a belt and wheels connecting the worm gearing with the friction pinion.

12. In a dough mixing machine, the combination with a tiltable receptacle, a rotatable element, of a reversible double speed friction drive for the rotatable element including a friction wheel having spaced hub and rim portions, and dumping mechanism comprising a friction pinion operating between the hub and rim portions of the friction wheel, means for moving the friction pinion into and out of engagement with the friction wheel, whereby the reversible friction drive is adapted to actuate the tilting receptacle in its dumping operation, worm gearing having a hand wheel and connected with the tiltable receptacle and separate gearing connecting the worm gearing with the friction pinion.

13. In a dough mixer, the combination with spaced supports, a rotatable element having journals forming a shaft, a tiltable receptacle provided with hollow journals mounted on the supports and receiving the said shaft, a reversible double speed friction drive connected with the shaft and including a friction wheel having spaced hub and rim portions, a gear connected with one of the journals of the tiltable receptacle, a friction pinion operating between the hub and rim portions, whereby the reversible friction drive is adapted to actuate the tilting receptable in its dumping operation, and means for connecting the friction pinion with the gear wheel.

14. In a dough mixer, the combination with spaced supports, a tiltable receptacle with journals mounted on these supports, a rotatable element whose shafts are mounted in the journals of the tiltable receptacle, a reversible double speed friction drive connected with the journals and including a friction wheel having spaced hub and rim portions, a worm sector or wheel mounted on one of the journals of the tiltable receptacle, a shaft having a worm meshing with the worm sector or wheel, a worm pinion mounted on the said shaft, a second shaft extending across one of the supports and having a hand wheel at one end and pivoted with a worm meshing with the said worm pinion, a friction pinion operating between the hub and rim portions of the friction wheel, whereby the reversible friction drive is adapted to actuate the tilting receptacle in its dumping operation, and gearing connecting the friction pinion with the said second shaft.

15. In a dough mixer, the combination with a rotatable element, of a reversible double speed drive including a rotary element having spaced hub and rim portions, and a co-acting pinion operating between the said hub and rim portions to rotate the agitator at high and low speed and reverse and stop the same.

16. In a dough mixer, the combination with a rotatable element, of a reversible double speed drive including a wheel having spaced hub and rim portions, a pinion operating between the said hub and rim portions and movable into and out of engagement with the same, gearing for connecting one of the said elements with the rotatable element, and means for applying power to the other element.

17. In a dough mixer, the combination of a rotatable element, a double speed drive including an operating lever and a clutch having a movable section, and means for connecting the lever with the movable section of the clutch to throw the same into and out of engagement simultaneously with the operation of the double speed drive.

18. In a dough mixer, the combination of a rotatable element, a double speed drive including an operating lever and a clutch having a movable section, and means for connecting the lever with the movable section of the clutch to throw the same into and out of engagement simultaneously with the operation of the double speed drive, said means including a slidable member having an arcuate slot and a pin operating in the slot and connected with the slidable member of the clutch.

19. In a dough mixer, the combination of a rotatable element, a double speed drive including an operating lever and a clutch having a movable section, a slidable bar having an arcuate slot, means carried by the slidable clutch member for engaging with the said slot, and means for connecting the bar with the lever.

20. In a dough mixer, the combination of a rotatable element, a double speed drive including an operating lever and a clutch having a movable section, a slidable bar having spaced longitudinal guide slots and provided with an arcuate slot, fixed pins operating in the longitudinal slots to guide the bar, means carried by the slidable clutch member for engaging the arcuate slot, and means for connecting the bar with the lever.

In testimony whereof I affix my signature in the presence of two witnesses.

FRANK X. LAUTERBUR.

Witnesses:
C. L. HASLUP,
URBAN H. DOORLEY.